July 31, 1923.
W. I. BALLENTINE
FLEXIBLE MOTOR SUPPORT
Filed April 12, 1922
1,463,568
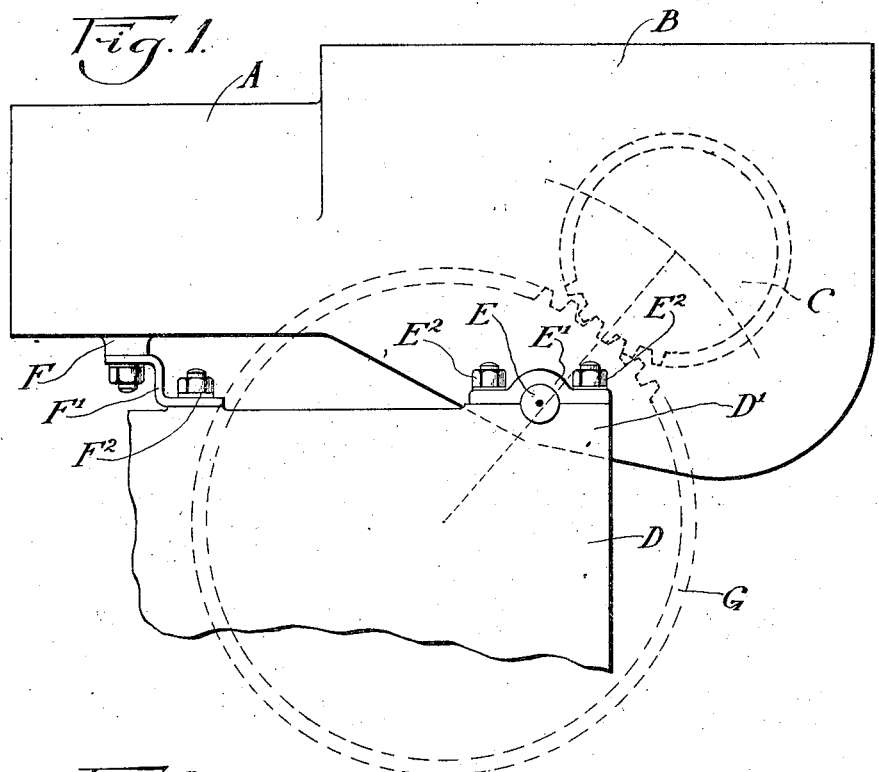
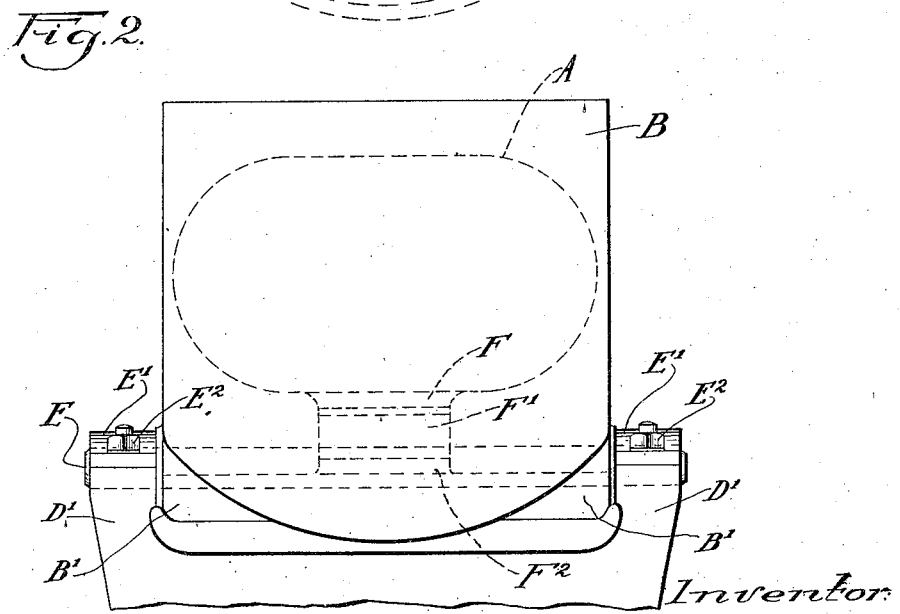
Inventor
William I. Ballentine
By Parker & Carter Attys.

Patented July 31, 1923.

1,463,568

UNITED STATES PATENT OFFICE.

WILLIAM I. BALLENTINE, OF LAPORTE, INDIANA, ASSIGNOR TO ADVANCE-RUMELY COMPANY, A CORPORATION OF INDIANA.

FLEXIBLE MOTOR SUPPORT.

Application filed April 12, 1922. Serial No. 552,025.

*To all whom it may concern:*

Be it known that I, WILLIAM I. BALLENTINE, a citizen of the United States, residing at Laporte, in the county of Laporte and State of Indiana, have invented a certain new and useful Improvement in Flexible Motor Supports, of which the following is a specification.

This invention relates to internal combustion engines intended primarily for use in automotive vehicles such as tractors and the like. It has for one object to provide means whereby the engine may be mounted so as to cushion shocks incident both to the operation of the engine and to the movement of the vehicle upon which it is mounted. It has for another object to provide means whereby the engine may be flexibly supported from the transmission case. Other objects will appear from time to time throughout the specification and claims.

My invention is illustrated diagrammatically in the accompanying drawings, wherein:

Figure 1 is a diagrammatic side elevation of the engine and transmission case, with parts omitted and parts broken away;

Figure 2 is a diagrammatic end elevation with the engine in position upon the crank case.

Like parts are designated by like characters throughout.

A is the cylinder block of an internal combustion engine. B is the crank case of the engine upon which are mounted a pair of supporting lugs B' B'. C is a clutch pinion driven by the engine through means not here shown as they form no part of the present invention.

D is the transmission case of the engine. It is provided adjacent its forward end with a pair of supporting brackets D' D'. E is a shaft which passes through the members E' E' of the crank case and is supported at either end in the brackets D' D' so that the engine is pivotally supported at this point. The shaft E is pressed into supporting lugs B', B', and the crank case B with the shaft E in place is then lowered into the bearings D' D' on the transmission case D and held in place by the bearing caps E' E' which are bolted in place upon the bearing brackets D' D', by means of bolts E² E². Towards its rear the engine has the downward projection F to which is attached a flexible support F' which in turn is bolted or secured in any other suitable manner to the top of the crank case D as at F².

G is an intermediate gear in mesh with the clutch pinion C. The wheels of the tractor or other vehicle operated by this engine are actuated through a train of transmission gears driven by this intermediate gear.

By this mounting shown the engine is given a three point support upon the transmission case, being supported adjacent its forward end on the two pivoted or hinged supports and adjacent its rear end on the flexible or yielding support.

Although I have shown an operative invention still it is obvious that many changes in size, shape and arrangement of parts might be made without departing materially from the spirit of my invention and I wish therefore that my showing be taken as in a sense diagrammatic.

The use and operation of my invention are as follows:

The parts are assembled as shown and when a shock is transmitted to the transmission case as the tractor moves over uneven ground or from any other cause, this shock is diminished before it reaches the engine because of the pivotal or hinged mounting of the forward end of the engine and because of the flexible mounting of the rear end of the engine which permits relative movement between the engine and the transmission case upon which it is supported. This mounting also serves to cushion any other shocks which may occur either in the transmission or in the engine because it permits relative movement of the two.

The pivotal support of the engine is located under the crank case so that vibration of the engine or any relative movement between the engine and transmission case will not injuriously affect the meshing of the gears. The center of the front support of the engine being slightly back of a straight line between the gear centers, when the tractor is moving forward and exerting drawbar pull in plowing, any movement of the engine from shock tends downward toward the transmission case at F, and as a resultant, the gear teeth would tend to move further apart, thus giving increased clearance. If the movement of the driving gear were sufficiently extended, however, the clearance would be increasingly reduced until ultimately normal clearance was attained.

It is apparent that any movement of the cylinder block from shock at the supporting point F disappears at the center of the pivotal support E. It is also apparent that the extent of the movement at F is proportionally lessened at any point which is closer to the pivotal point E than to the slightly yielding point F.

Therefore, by as much as the distance from the center of pivotal point E is less to the contact point of the pitch line circles of the gears than it is from the pivoting point E to the supporting point F on the cylinder block, by so much is any movement at F reduced at the point of contact of the pitch line circles.

Furthermore, it is apparent that due to the location of the pivotal center of the engine in relation to the two gear centers any movement of the driving gear C is necessarily in part a rolling movement of its pitch line circle on the fixed pitch line circle of gear G, tending to move the driving gear so that the pivotal center comes into a straight line drawn through the two gear centers as above noted.

Inasmuch as the movements of the engine from shock are always within narrow limits at the point of extreme movement F; and the extent of these slight movements at F are proportionally reduced at the contact point of the respective pitch line circles; and as this greatly reduced movement at the contact point of pitch circles is composed in part of a rolling movement of the pitch line circle of gear C and the immediate effect would tend to move the gear teeth farther apart, it is obvious that under the combination of these conditions the variations in distance from center to center of these gears from shock become so micrometrically minute as to be much within the accepted limits of efficient working tolerance.

For purposes of inspection and repair the rear flexible support may be removed and the entire engine may be rotated about its pivotal support.

I claim:

1. In combination a transmission case and an engine supported therefrom and connected thereto by a plurality of connections, one of said connections being pivotal and the other flexible, a gear driven by said engine and extending therefrom and a gear extending from said transmission case and in mesh with said driven gear, the center of the pivotal support being slightly to one side of a straight line drawn between the centers of the two gears.

2. In combination a transmission case and an engine supported therefrom at a plurality of points, a pair of lugs extending from said transmission case and a shaft connected to said engine and resting in said lugs and providing a pivotal support for the engine, and an additional flexible connection connected to said engine and to said transmission case, said engine and said transmission case adapted to have relative movement.

3. In combination with an automotive vehicle a transmission case and an engine supported thereon at a plurality of points, a pair of lugs extending from said transmission case and a shaft connected to said engine and resting in said lugs and providing a pivotal support for the engine, and an additional flexible connection connected to said engine and to said transmission case, said engine and said transmission case adapted to have relative movement.

4. In combination a transmission case and an engine supported thereon at a plurality of points, a pair of lugs extending from said transmission case and a shaft connected to said engine and resting in said lugs and providing a pivotal support for the engine, and an additional flexible connection connected to said engine and to said transmission case, said engine and said transmission case adapted to have relative movement, and a gear driven by said engine and extending therefrom and a gear extending from said transmission case in mesh with said driven gear, the center of the pivotal support being slightly to one side of a straight line drawn between the centers of the two gears.

5. In combination a chassis, an engine mounted thereupon and adapted to have minutely limited movement relative thereto, said engine adapted to move about an axis other than the axis of its shaft and including in its support a spring element normally unyielding and adapted to yield slightly under the influence of violent shocks.

6. In combination a chassis, an engine mounted thereupon from a plurality of supports, one of said supports being pivotal and the other slightly flexible, said engine adapted to have minutely limited movement relative to said chassis, said engine adapted to move about an axis other than the axis of its shaft and including in its support a spring element normally unyielding and adapted to yield slightly under the influence of violent shocks.

7. In combination a chassis, an engine mounted thereupon, a transmission case, a gear extending from said transmission case, said engine adapted to have minutely limited pivotal movement relative to said chassis, said movement being through an arc concentric with said gear the support of the engine including a spring element normally unyielding and adapted to yield slightly under the influence of violent shocks.

8. In combination a chassis, an engine mounted thereupon and adapted normally to be held against movement relative thereto and adapted under the influence of violent shocks to have minute relative movement the support of the engine including a spring element normally unyielding and adapted to yield slightly under the influence of violent shocks.

9. In combination a transmission case, and an engine supported therefrom adapted normally to be held against movement relative thereto and adapted under the influence of violent shocks to have minute relative movement the support of the engine including a spring element normally unyielding and adapted to yield slightly under the influence of violent shocks.

10. In combination a transmission case, and an engine supported therefrom adapted normally to be held against movement relative thereto and adapted under the influence of violent shocks to have minute relative movement, a gear driven by said engine and a gear extending from said transmission case and in mesh with said driven gear, the two being mounted so that they remain in mesh irrespective of the relative movement of the engine and transmission case the support of the engine including a spring element normally unyielding and adapted to yield slightly under the influence of violent shocks.

11. In combination a chassis, an engine pivotally mounted thereupon and adapted to have minutely limited relative movement thereto, the pivot point of said engine being intermediate its ends, said engine adapted to move about an axis other than the axis of its shaft.

12. In combination a chassis, an engine pivotally mounted thereupon and adapted to have minutely limited relative movement thereto, the pivot point of said engine being intermediate its ends, said engine adapted to move about an axis other than the axis of its shaft, said engine being normally in a condition of balance.

13. In combination a transmission case, and an engine supported therefrom adapted normally to be held against movement relative thereto, and adapted under the influence of violent shocks to have minute relative movement thereto, said engine including in its support an element normally unyielding and adapted to yield under the influence of violent shocks, a gear driven by said engine, and a gear extending from said transmission case and in mesh with said driven gear, said engine and said driven gear rotating about separate axes, the driven gear and the engine gear being mounted so that they remain in mesh irrespective of the relative movement of the engine and transmission case.

Signed at Laporte, county of Laporte and State of Indiana, this 6th day of April 1922.

WILLIAM I. BALLENTINE.